United States Patent
Gu

(10) Patent No.: US 7,403,194 B2
(45) Date of Patent: Jul. 22, 2008

(54) IMAGE DISPLAYER HAVING FUNCTION OF AUTOMATICALLY ELIMINATING AFTERIMAGE AND A METHOD THEREOF

(75) Inventor: Sung-jin Gu, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 576 days.

(21) Appl. No.: 10/713,267

(22) Filed: Nov. 17, 2003

(65) Prior Publication Data

US 2004/0135768 A1 Jul. 15, 2004

(30) Foreign Application Priority Data

Dec. 26, 2002 (KR) .................. 10-2002-0084576

(51) Int. Cl.
*G09G 5/00* (2006.01)
(52) U.S. Cl. .................. 345/204; 345/55; 345/581
(58) Field of Classification Search .............. 345/204, 345/581, 55
See application file for complete search history.

(56) References Cited

U.S. PATENT DOCUMENTS 6,401,209 B1 * 6/2002 Klein .................. 726/34
6,628,247 B2 * 9/2003 Toffolo et al. .............. 345/31
2003/0076332 A1 * 4/2003 Choi .................. 345/581

FOREIGN PATENT DOCUMENTS

JP 07-295531 A * 11/1995

* cited by examiner

*Primary Examiner*—Richard Hjerpe
*Assistant Examiner*—Leonid Shapiro
(74) *Attorney, Agent, or Firm*—Sughrue Mion, PLLC

(57) ABSTRACT

An image displayer having a function of automatically eliminating an afterimage, comprises a signal processing unit for processing signals inputted from an external device and outputting video signals and audio signals to a display and a speaker, respectively, a detecting sensor for detecting whether there exists a user within a predetermined range from the display when a still picture corresponding to video signals of an identical pattern outputted from the signal processing unit is displayed on the display beyond a pre-set time, and a control unit for controlling the signal processing unit to display an afterimage-eliminating picture on the display when a signal corresponding to the non-presence of the user within the predetermined range is outputted from the detecting sensor, thereby eliminating the afterimage caused due to the still picture. Accordingly, the afterimage eliminating function is automatically performed without manipulation input of the user.

14 Claims, 3 Drawing Sheets

IMAGE DISPLAYER HAVING FUNCTION OF AUTOMATICALLY ELIMINATING AFTERIMAGE AND A METHOD THEREOF

CROSS-REFERENCE TO RELATED APPLICATIONS

This application claims the benefit of Korean Application No. 2002-84576, filed Dec. 26, 2002, in the Korean Intellectual, the disclosure of which is incorporated herein by reference.

BACKGROUND

1. Field of the Invention

The present invention relates to an image displayer, and more particularly, to an image displayer having an afterimage-elimination function.

2. Description of the Related Art

Generally, displayers such as a Cathode Ray Tube (CRT), a Liquid Crystal Display (LCD), a Plasma Display Panel (PDP), and the like for displaying an image have a drawback that their fluorescent substance or light emitting device is deteriorated or deformed when a display of a still picture continues for a long time. For example, when an image displayer displays stock quotations, since a still picture having characters and graphs concentrated on specific pixels of the image displayer is displayed for a long time, it is often the case that the lifespan of the specific pixels become shorter than those of their neighboring pixels. In the case of a PDP, which uses ultraviolet rays generated during a gas discharging to display an image, the problem of deterioration of pixels becomes more serious. The PDP applies an electric field to a tube having helium and a xenon gas injected therein in order to generate light. Even though the supply of the electric field is stopped, the electric field still remains for a predetermined time, causing an electric discharge to occur. That is, the PDP displays the still picture including the characters and the graphs for the stock quotations program, with a result that the specific pixels corresponding to the still picture continues emitting the light and the specific pixels become brighter than required. Due to such remaining electric field, the pixels have an afterimage of the still picture which remains when the still picture is changed into another picture.

In order to minimize the afterimage, a variety of methods have been conventionally suggested. For example, one of them, as shown in FIG. 1, is to reduce the afterimage by moving a picture position up and down and right and left at regular time intervals when a still picture is displayed on a screen and/or a display beyond a predetermined time. According to this method, the time interval and the length of the movement of the picture position can be adjusted for the user's convenience. Accordingly, the picture as displayed returns to the original position after a predetermined time and the pixels of the still picture can be protected to some degree. However, the user feels inconvenience because the picture has to be moved when he/she is viewing the picture. Also, since the moving path is determined at each time interval, the pixel having the moving path as determined cannot be completely prevented from deteriorating and thus the afterimage cannot be prevented.

Another method has the aim of reducing a luminosity of each of the pixels consisting a still picture to 50%. However, this method cannot prevent the deterioration of the pixels and the afterimage occurring when the still picture is displayed for a long time.

Still another method is to convert a picture itself to a reverse picture in accordance with a user's selection of a menu as shown in FIG. 1B, and then return it to the original picture. In this case, if a user is not aware of the features of a product, it is difficult for the user to execute this method. Especially, in the case of an expensive PDP, the problem of the afterimage becomes more serious.

SUMMARY

The present invention has been developed in order to solve the above problems in the prior art. Accordingly, an aspect of the present invention provides an image displayer having a function of automatically eliminating an afterimage and a method thereof capable of automatically performing an afterimage-eliminating function without manipulation of a user when displaying of a still picture continues for a predetermined time and there exists no user within a viewing distance, and performing the afterimage eliminating function in accordance with a user's selection.

The above aspect is achieved by providing an image displayer having a function of automatically eliminating an afterimage. The image displayer comprises a signal processing unit for processing signals and outputting video signals to a display, a detecting sensor for detecting whether there exists a user within a predetermined range from the display when a still picture corresponding to video signals of an identical pattern outputted from the signal processing unit is displayed on the display beyond a pre-set time, and a control unit for controlling the signal processing unit to display an afterimage-eliminating picture on the display when a signal corresponding to the non-presence of the user is outputted from the detecting sensor, thereby eliminating the afterimage caused by the still picture.

The image displayer further comprises an On-Screen Display (OSD) processing unit outputting to the signal processing unit a pre-set OSD signal indicating that the afterimage-eliminating picture is being displayed on the display, corresponding to a signal outputted from the control unit when the afterimage-eliminating picture is displayed on the display.

The image displayer further comprises an audio message storage unit outputting a pre-set audio signal to the signal processing unit to output an auditory cue indicating that the afterimage-eliminating picture is being displayed, corresponding to a signal outputted from the control unit when the afterimage-eliminating picture is displayed on the display.

The control unit comprises a still picture detecting portion sequentially comparing the video signals outputted from the signal processing unit by each frame, thereby detecting a still picture in which identical video signals are inputted beyond a pre-set time, a controller outputting a command to eliminate the afterimage occurring due to the still picture when the still picture is detected and a user non-presence signal is inputted from the detecting sensor, and an afterimage-eliminating picture storage portion generating and outputting to the signal processing unit a signal corresponding to the command that is inputted from the controller to eliminate the afterimage.

Meanwhile, on receipt of the signal indicating that there exists a user within the predetermined range from the detecting sensor, the controller controls the OSD processing unit to output a pre-set OSD signal to the signal processing unit, thereby allowing the user to select whether to perform an afterimage-eliminating function. In providing a user selection, the image displayer further comprises an input unit that allows a user to select whether to perform the afterimage-eliminating function.

Another illustrative, non-limiting embodiment of the image displayer comprises a display; a processor for processing signals to be displayed on the display; a sensor for detecting a presence or a non-presence of a user within a predetermined range from the display when a still picture is output from the processor and displayed on the display beyond a pre-set time period; and a controller unit for controlling the processor to display an afterimage-eliminating picture to eliminate an afterimage due to the still picture on the display when the sensor detects the non-presence of the user.

The image displayer further comprising a second processor for outputting an indicating signal to the processor, wherein the indicating signal indicates that the afterimage-eliminating picture is being displayed on the display.

The image displayer further comprising an audio emitter for emitting audio cues; and an audio unit for outputting audio cues that the afterimage-eliminating picture is being displayed, to the audio emitter.

The controller unit further comprises a comparator for comparing the signals outputted from the processor thereby detecting the still picture; a command generator for outputting a command to eliminate the afterimage when the still picture is detected and the non-presence of the user is detected; and an afterimage-eliminating picture generator for generating and outputting to the processor an afterimage-eliminating picture signal.

Additionally, the image displayer provides that if the sensor detects the presence of the user, the processor displays an on-screen display to allow the user to select whether to perform an afterimage-eliminating function.

The image displayer also provides that the processor processes signals to be output by the audio emitter.

The above aspect is achieved by providing an afterimage-eliminating method of an image displayer having a function of automatically eliminating an afterimage. The method comprises the steps of processing signals inputted from an external device and outputting video signals to a display, sequentially comparing the video signals as outputted by each frame, thereby detecting a still picture in which identical video signals are inputted beyond a pre-set time, detecting whether there exists a user within a predetermined range from the display when the still picture is detected in the still image detecting step, and displaying on the display an afterimage-eliminating picture eliminating an afterimage caused, due to the still picture, when it is detected that no user exists within the predetermined range.

The step of displaying the afterimage-eliminating picture on the display further comprises the step of outputting a pre-set OSD signal indicating that the afterimage-eliminating picture is being displayed on the display when the afterimage-eliminating picture is displayed on the display.

Also, the step of displaying the afterimage-eliminating picture on the display further comprises the steps of outputting a pre-set audio signal to output a voice message from an audio emitter indicating that the afterimage-eliminating picture is being displayed when the afterimage-eliminating picture is displayed on the display.

The afterimage-eliminating method further comprises the step of outputting a pre-set OSD information on receipt of a signal indicating that there exists a user within the predetermined range, thereby allowing the user to select whether to perform an afterimage eliminating function.

The afterimage-eliminating method further comprises the step of selecting, by the user, to perform or not perform the afterimage-eliminating function.

Another illustrative, non-limiting embodiment of the afterimage-eliminating method of an image displayer comprises processing input signals to be displayed on a display; sequentially comparing the input signals; detecting a still picture when the respective, sequentially compared input signals are identical beyond a preset time period; detecting whether a user is within a predetermined range from the display when the still picture is detected; and displaying on the display an afterimage-eliminating picture for eliminating an afterimage due to the detected still picture when no user is detected.

BRIEF DESCRIPTION OF THE DRAWINGS

The above aspects and other features of the present invention become more apparent by describing non-limiting, illustrative embodiments of the present invention with reference to the accompanying drawings, in which.

DESCRIPTION OF EXEMPLARY EMBODIMENTS

Hereinafter, the present invention will be described in greater detail with reference to the accompanying drawings.

Figure 1A:
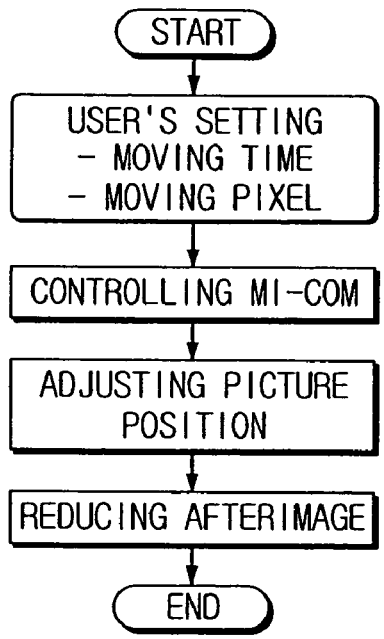
FIGS. 1A and 1B are flowcharts showing conventional afterimage-eliminating methods.
Figure 1B:
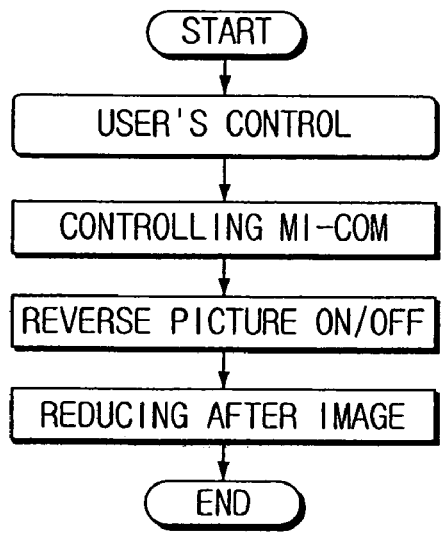
Figure 2:
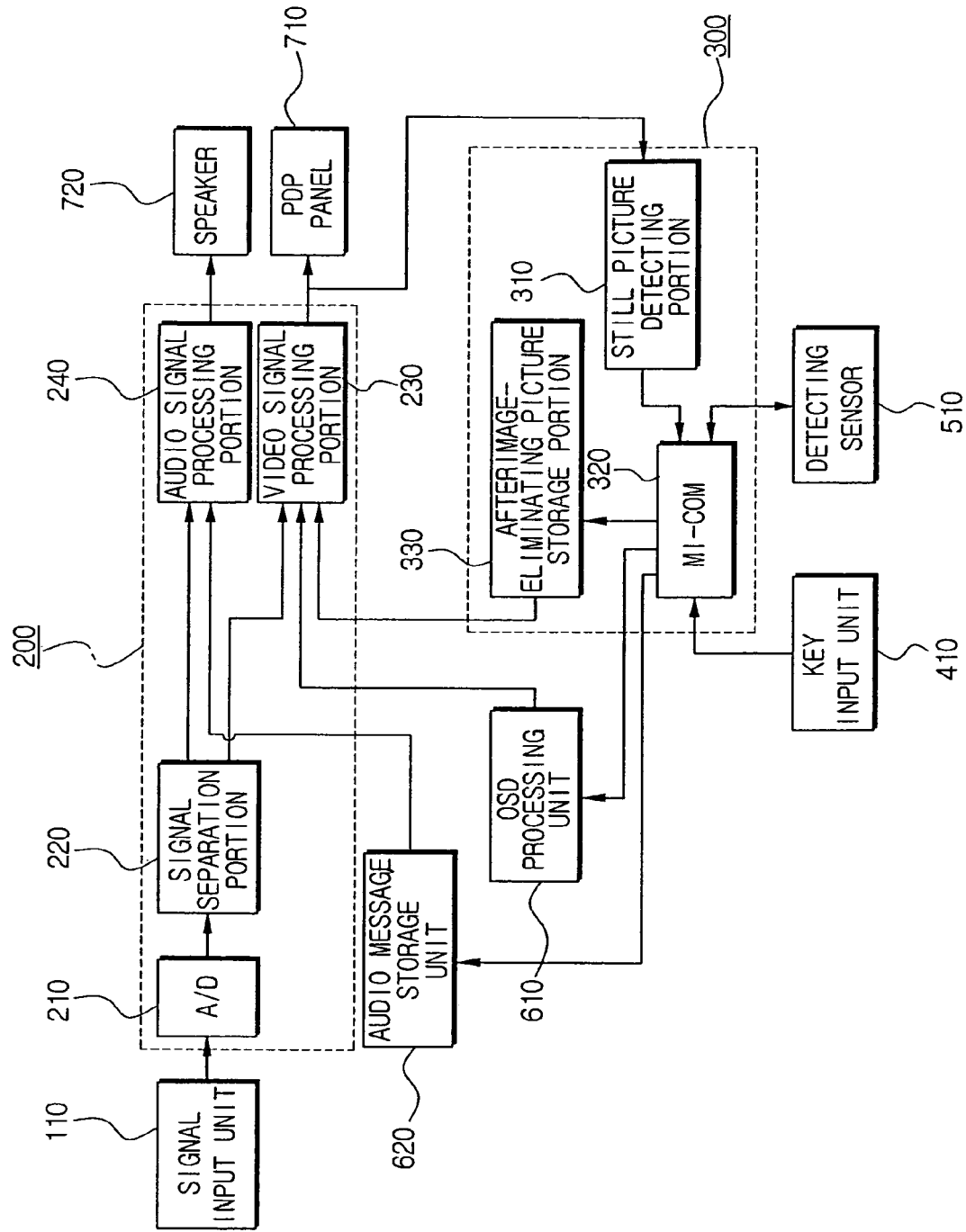
FIG. 2 is a block diagram showing an image displayer having a function of automatically eliminating an afterimage according to a non-limiting, illustrative embodiment of the present invention.

FIG. 2 is a block diagram showing an image displayer having a function of automatically eliminating an afterimage according to a non-limiting, illustrative embodiment of the present invention.

As shown in FIG. 2, an image displayer having a function of automatically eliminating an afterimage includes a signal input unit 110, a signal processing unit 200, a control unit 300, a key input unit 410, a detecting sensor 510, an OSD processing unit 610, an audio message storage unit 620, a PDP panel 710, and a speaker 720.

The signal input unit 110 receives and outputs to the signal processing unit 200 broadcasting signals transmitted from a broadcasting station or a satellite and signals transmitted from a Personal Computer (PC) or any other type of device that is capable of transmitting visual and/or visual/audio signals.

The signal processing unit 200 includes an analog-to-digital converter 210, a signal separation portion 220, a video signal processing portion 230, and an audio signal processing portion 240.

The analog-to-digital converter 210 performs an analog-to-digital conversion with respect to the broadcasting signals as tuned, and the signal separation portion 220 separates the broadcasting signals outputted from the analog-to-digital converter 210 into video signals and audio signals. The video signal processing portion 230 and the audio signal processing 240 process and output the video and the audio signals to the PDP panel 710 and the speaker 720, respectively.

The control unit 300 includes a still picture detecting portion 310, a micro-computer 320, and an afterimage-eliminating picture storage portion 330.

The still picture detecting portion 310 sequentially stores the video signals outputted from the video signal processing portion 230 in each frame and sequentially compares the stored frames. Through this comparison, the still picture detecting portion 310 detects whether the PDP panel 710 displays an identical picture i.e. a still picture for a longer time than a pre-set time, and outputs the result of the detection to the micro-computer 320.

Also, when a moving picture is displayed on the PDP panel 710 but its caption is not changed, the still picture detecting portion 310 detects broadcasting caption signals, teletext signals, teleweb signals, and so on.

The micro-computer 320 controls the afterimage-eliminating picture storage portion 330, the detecting sensor 510, the OSD processing unit 610, and the audio message storage unit 620 based on the input signals from the still picture detecting portion 310.

When the micro-computer 320 is input with a still picture detecting signal from the still picture detecting portion 310, the micro-computer 320 controls the detecting sensor 510 to detect whether there exists a user within a predetermined range from the PDP panel 710.

If it is detected that no user exists, the micro-computer 320 controls the afterimage-eliminating picture storage portion 330 to output a pre-set afterimage-eliminating picture to the video processing portion 230 and display the afterimage-eliminating picture on the PDP panel 710.

Also, when the afterimage-eliminating picture is displayed on the PDP panel 710, the micro-computer 320 controls the OSD processing unit 610 to output to the video signal processing portion 230 a signal indicating that the afterimage-eliminating picture is being displayed. Accordingly, an OSD information indicating that the afterimage-eliminating picture is being displayed is displayed on the PDP panel.

Meanwhile, when the afterimage-eliminating picture is displayed on the PDP panel 710, the micro-computer 320 controls the audio message storage unit 620 to output to the audio signal processing portion 240 a signal indicating that the afterimage-eliminating picture is being displayed. Accordingly, a voice indicating that the afterimage- eliminated picture is being displayed is output through the speaker 720, If it is detected that there exists a user by the detecting sensor 510, the micro-computer 320 controls the OSD processing unit 610 to output to the video signal processing portion 230 a signal corresponding to information that allows the user to select whether to perform the afterimage-eliminating function through the key input unit 410. Accordingly, through the information displayed on the PDP panel 710, the user can perceive problems of the afterimage and the image defects caused by the still picture, and perform the afterimage-eliminating function when he/she wishes to display the afterimage-eliminated picture.

Figure 3:
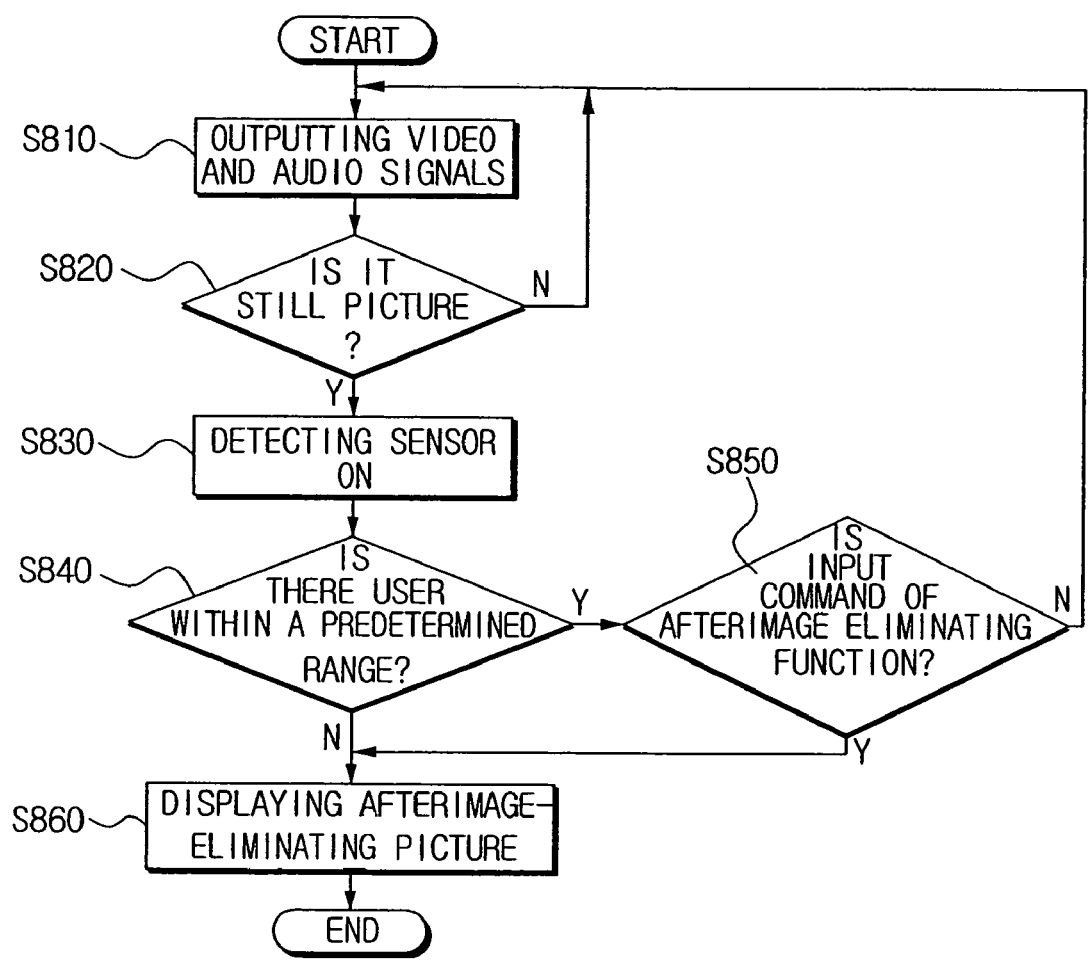
FIG. 3 is a flowchart showing an afterimage-eliminating method of an image displayer having a function of automatically eliminating an afterimage according to a non-limiting, illustrative embodiment of the present invention.

FIG. 3 is a flowchart showing an afterimage-eliminating method of the image displayer having the function of automatically eliminating the afterimage according to the present invention.

The afterimage-eliminating method of the present invention includes the steps of outputting video and audio signals (S810), detecting a still picture (S820), detecting whether there exists a user or not (S840), and displaying an afterimage-eliminating image on the PDP panel 710 (S860).

The step of outputting the video and the audio signals (S810) performs analog-to-digital conversion with respect to signals inputted from the outside, separates the signals into video signals and audio signals, processes with respect to the respective video and the audio signals, and respectively outputs the video signals and the audio signals to a PDP panel 710 and a speaker 720.

The step of detecting the still picture (S820) compares video signals outputted from the S810 by each frame sequentially, and detects a still picture in which identical video signals are inputted beyond a pre-set time.

The step of detecting whether there exists a user (S840) operates the detecting sensor (S830) and detects whether there exists a user within a predetermined range from the PDP panel 710 when the still picture is detected as a result of S820.

If it is detected that no user exists within the predetermined range as a result of S840, the image displayer takes the step of displaying an afterimage-eliminating picture eliminating an afterimage caused due to the still picture on the PDP panel 710 (S860).

Preferably, while the afterimage-eliminating picture is displayed on the PDP panel 710, a pre-set OSD information indicating that the afterimage-eliminating picture is being displayed is displayed on the PDP panel 710.

Also, while the afterimage-eliminating picture is being displayed on the PDP panel 710, a pre-set audio signal corresponding to a voice message indicating that the afterimage-eliminating image is being displayed is output through the speaker.

Preferably, when a signal indicating that there exists a user within the predetermined range is input as a result of the S840, the pre-set OSD information is output to allow the user to select whether to perform the afterimage eliminating function. Accordingly, the user is allowed to input a command of the afterimage-eliminating function when he/she perceives the OSD information (S850).

According to the present invention, when the displaying of the still picture continues beyond a predetermined time and there exists no user in a viewing distance, since the afterimage eliminating function is automatically performed without manipulation input of the user, the quality and reliability of the displayer can be improved. Also, during the operation of the afterimage-eliminating function, the current state can be displayed through the OSD information or audio message.

The foregoing embodiment and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An image displayer having a function of automatically eliminating an afterimage, the image displayer comprising:

a signal processing unit for processing signals and outputting video signals to a display;

a detecting sensor for detecting whether there exists a user within a predetermined range from the display when a still picture corresponding to video signals of an identical pattern outputted from the signal processing unit is displayed on the display beyond a pre-set time;

a control unit for controlling the signal processing unit to display an afterimage-eliminating picture on the display when a signal corresponding to a non-presence of the user is outputted from the detecting sensor, thereby eliminating the afterimage caused due to the still picture; and an On-Screen Display (OSD) processing unit outputting to the signal processing unit a pre-set OSD signal indicating that the afterimage-eliminating picture is being displayed on the display, corresponding to a signal outputted from the control unit when the afterimage-eliminating picture is displayed on the display, wherein, on receipt of a signal indicating that there exists the user within the predetermined range from the detecting sensor, the control unit controls the OSD processing unit to output the pre-set OSD signal to the signal processing unit, thereby allowing the user to select whether to perform an afterimage-eliminating function.

2. The image displayer of claim 1, further comprising:
an audio message storage unit outputting a pre-set audio signal to the signal processing unit to output an auditory cue indicating that the afterimage-eliminating picture is being displayed, corresponding to a signal outputted from the control unit when the afterimage-eliminating eliminating picture is displayed on the display.

3. The image displayer of claim 1, wherein the control unit comprises:
a still picture detecting portion sequentially comparing the video signals outputted from the signal processing unit by each frame, thereby detecting the still picture in which identical video signals are inputted beyond the pre-set time;
a controller outputting a command to eliminate the afterimage occurring due to the still picture when the still picture is detected and the user non-presence signal is inputted from the detecting sensor; and
an afterimage-eliminating picture storage portion generating and outputting to the signal processing unit a signal corresponding to the command that is inputted from the controller to eliminate the afterimage.

4. The image displayer of claim 1, further comprising an input unit that allows a user to select whether to perform the afterimage-eliminating function.

5. An image displayer comprising:
a display;
a processor for processing signals to be displayed on the display;
a sensor for detecting a presence or a non-presence of a user within a predetermined range from the display when a still picture is output from the processor and displayed on the display beyond a pre-set time period; and
a controller unit for controlling the processor to display an afterimage-eliminating picture to eliminate an afterimage due to the still picture on the display when the sensor detects the non-presence of a user,
wherein if the sensor detects the presence of the user, the processor displays an on-screen display to allow the user to select whether to perform an afterimage-eliminating function.

6. The image displayer of claim 5, further comprising:
a second processor for outputting an indicating signal to the processor, wherein the indicating signal indicates that the afterimage-eliminating picture is being displayed on the display.

7. The image displayer of claim 5, further comprising:
an audio emitter for emitting audio cues;
an audio unit for outputting audio cues that the afterimage-eliminating picture is being displayed, to the audio emitter.

8. The image displayer of claim 5, wherein the controller unit comprises:
a comparator for comparing the signals outputted from the processor thereby detecting the still picture;
a command generator for outputting a command to eliminate the afterimage when the still picture is detected and the non-presence of the user is detected; and an afterimage-eliminating picture generator for generating and outputting to the processor an afterimage-eliminating picture signal.

9. The image displayer of claim 5, wherein the processor processes signals to be output by an audio emitter.

10. An afterimage-eliminating method of an image displayer having a function of automatically eliminating an afterimage, the method comprising the steps of:
processing signals inputted from an external device and outputting video signals to a display;
sequentially comparing the video signals as outputted by each frame, thereby detecting a still picture in which identical video signals are inputted beyond a pre-set time;
detecting whether there exists a user within a predetermined range from the display when the still picture is detected in the still image detecting step; and
displaying on the display an afterimage-eliminating picture eliminating an afterimage caused, due to the still picture when it is detected that no user exists within the predetermined range,
wherein the step of displaying the afterimage-eliminating picture on the display further comprises a step of outputting a pre-set On-Screen Display (OSD) information on receipt of a signal indicating that there exists the user within the predetermined range, thereby allowing the user to select whether to perform an afterimage-eliminating function.

11. The afterimage-eliminating method of claim 10, wherein the step of displaying the afterimage-eliminating picture on the display further comprises the step of outputting a pre-set OSD signal indicating that the afterimage-eliminating picture is being displayed on the display when the afterimage-eliminating picture is displayed on the display.

12. The afterimage-eliminating method of claim 10, wherein the step of displaying the afterimage-eliminating picture on the display further comprises the steps of outputting a pre-set audio signal to output a voice message from an audio emitter indicating that the afterimage-eliminating picture is being displayed when the afterimage-eliminating picture is displayed on the display.

13. The afterimage-eliminating method of claim 10, further comprising the step of selecting, by the user, to perform or not perform the afterimage-eliminating function.

14. An afterimage-eliminating method of an image displayer comprising:
processing input signals to be displayed on a display;
sequentially comparing the input signals;
detecting a still picture when the respective, sequentially compared input signals are identical beyond a preset time period;
detecting whether a user is within a predetermined range from the display when the still picture is detected; and
displaying on the display an afterimage-eliminating picture for eliminating an afterimage due to the detected still picture when no user is detected,
wherein the step of displaying the afterimage-eliminating picture on the display comprises a step of outputting a pre-set On-Screen Display (OSD) information if the user is detected to be within the predetermined range, thereby allowing the user to select whether to perform an afterimage-eliminating function.

* * * * *